US012754142B2

(12) United States Patent
Hsu et al.

(10) Patent No.: US 12,754,142 B2
(45) Date of Patent: Oct. 6, 2026

(54) COMPOSITE STRUCTURE DETECTING METHOD AND SYSTEM

(71) Applicant: Advanced ACEBIOTEK CO., LTD., Hsinchu County (TW)

(72) Inventors: Yung-Chou Hsu, New Taipei City (TW); Hui-Shun Kuan, Taipei City (TW); Chan-Shan Yang, Taipei City (TW); Ting Cheng, Taipei City (TW); Jyh-Chern Chen, New Taipei City (TW); Shen-Fu Hsu, Taitung County (TW)

(73) Assignee: Advanced ACEBIOTEK CO., LTD., Hsinchu County (TW)

( * ) Notice: Subject to any disclaimer, the term of this patent is extended or adjusted under 35 U.S.C. 154(b) by 114 days.

(21) Appl. No.: 18/813,045

(22) Filed: Aug. 23, 2024

(65) Prior Publication Data

US 2025/0377310 A1 Dec. 11, 2025

(51) Int. Cl.

| | |
|---|---|
| ***G01N 21/00*** | (2006.01) |
| ***G01N 21/3563*** | (2014.01) |
| ***G01N 21/3581*** | (2014.01) |
| ***G01N 21/95*** | (2006.01) |

(52) U.S. Cl.

CPC ......... *G01N 21/95* (2013.01); *G01N 21/3563* (2013.01); *G01N 21/3581* (2013.01)

(58) Field of Classification Search

CPC ............... G01N 21/3581; G01N 21/95; G01N 21/9505; G01N 21/3563

See application file for complete search history.

(56) References Cited

U.S. PATENT DOCUMENTS

2021/0356394 A1* 11/2021 Wallace ................. G01N 21/55

FOREIGN PATENT DOCUMENTS

| | | |
|---|---|---|
| CN | 108535212 | 9/2018 |
| CN | 111712729 | 9/2020 |
| CN | 114739947 | 7/2022 |
| JP | 2013-2859 | 1/2013 |
| JP | 2023-164259 | 11/2023 |
| TW | 202223397 | 6/2022 |
| TW | 202307417 | 2/2023 |
| WO | 2018/105332 | 6/2018 |

* cited by examiner

*Primary Examiner* — Dani Fox

(74) *Attorney, Agent, or Firm* — Winston Hsu

(57) ABSTRACT

A composite structure detecting method includes generating a terahertz emission electromagnetic wave incident on a composite structure, wherein the composite structure comprises a plurality of interface layers; detecting a plurality of terahertz reception electromagnetic waves reflected, transmitted, or scattered after the terahertz emission electromagnetic wave is incident on the plurality of interface layers of the composite structure; measuring a plurality of characteristic signals based on the terahertz emission electromagnetic wave and the plurality of terahertz reception electromagnetic waves; and analyzing the plurality of characteristic signals to determine a plurality of characteristics of the plurality of interface layers.

18 Claims, 12 Drawing Sheets

COMPOSITE STRUCTURE DETECTING METHOD AND SYSTEM

BACKGROUND OF THE INVENTION

1. Field of the Invention

The present invention relates to a composite structure detecting method and system, and more particularly, to a composite structure detecting method and system enabling non-contact and non-destructive detection for a composite structure.

2. Description of the Prior Art

As electronic products become increasingly complex, their components often adopt composite structures. These composite structures typically involve stacking multiple materials, with thickness ranging from nanometers (nm) to micrometers (μm). The manufacturing process of electronic products inevitably includes various inspection procedures to ensure proper functionality and structural integrity. However, non-destructive measurement techniques for detecting internal defects in composite structures remain limited in the prior art. Specifically, common optical measurements for composite structures rely on the transparency of the specimens, allowing visible light to pass through. When the material is not transparent, visible light cannot penetrate, rendering measurement impossible.

Taking silicon photonics (SiPh) as an example, SiPh utilizes Co-Packaged Optics (CPO) technology to integrate electronic integrated circuits (EIC) and photonic integrated circuits (PIC) on the same platform. These structures involve stacking different materials (such as silicon dioxide, silicon nitride, and gallium arsenide) on a silicon substrate. Compared to copper wires used for electronic transmission, optical interconnects operate efficiently over both short and long distances, offering low latency, low energy consumption, high speed, and high capacity. The primary purpose of photonic integrated circuits is to couple, transmit, modulate, receive optical signals, and convert the optical signals into electrical signals. Therefore, key components in photonic integrated circuits include light couplers (for introducing light into waveguides), waveguides (for transmitting optical signals), modulators (for modulating optical signals), and photodetectors (for converting received light into electrical signals). The waveguide structure in photonic integrated circuits typically consists of high-resistivity silicon substrate (HR-Si), an insulating layer (SiO2), silicon nitride (SiN), and another high-resistivity silicon layer (HR-Si), etc., forming a "sandwich" structure. Silicon nitride (Si3N4) is commonly used as the material for waveguides, with typical layer thickness exceeding 15 μm.

In the manufacturing process of silicon photonics using complementary metal oxide semiconductor (CMOS) technology within the Co-Packaged Optics (CPO) framework, various processing steps such as deposition, etching, and photolithography are employed to stack materials according to the pre-designed circuit patterns on the substrate. However, the completed structures may exhibit variations in layer thickness, residual internal defects, overlay errors due to exposure misalignment, and differences in doping concentration. Since many materials are not transparent to visible light, inspection of the completed structures often requires scanning electron microscopy (SEM) or transmission electron microscopy (TEM) before cladding deposition on the waveguide, or requires measurements of light intensity loss for light emitted from the waveguide. In other words, the prior art techniques cannot simultaneously assess the electrical characteristics and structure of silicon photonics components. Additionally, electron microscopy inspections are often destructive, highlighting the need for improved non-destructive testing methods for composite structures.

SUMMARY OF THE INVENTION

Therefore, the present invention is to provide a composite structure detecting method and system to solve the above issues.

An embodiment of the present invention discloses a composite structure detecting method, which comprises generating a terahertz emission electromagnetic wave incident on a composite structure, wherein the composite structure comprises a plurality of interface layers; detecting a plurality of terahertz reception electromagnetic waves reflected, transmitted, or scattered after the terahertz emission electromagnetic wave is incident on the plurality of interface layers of the composite structure; measuring a plurality of characteristic signals based on the terahertz emission electromagnetic wave and the plurality of terahertz reception electromagnetic waves; and analyzing the plurality of characteristic signals to determine a plurality of characteristics of the plurality of interface layers.

Another embodiment of the present invention discloses a composite structure detection system, which comprises a terahertz electromagnetic wave generator, configured to generate a terahertz emission electromagnetic wave incident on a composite structure, wherein the composite structure comprises a plurality of interface layers; a terahertz electromagnetic wave receiver, configured to detect a plurality of terahertz reception electromagnetic waves reflected, transmitted, or scattered after the terahertz emission electromagnetic wave is incident on the plurality of interface layers of the composite structure; and a detection device, coupled to the terahertz electromagnetic wave generator and the terahertz electromagnetic wave receiver, configured to measure a plurality of characteristic signals based on the terahertz emission electromagnetic wave and the plurality of terahertz reception electromagnetic waves, and analyze the plurality of characteristic signals to determine a plurality of characteristics of the plurality of interface layers.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

To effectively detect composite structures, especially to simultaneously assess electrical and structural characteristics, the present invention employs terahertz electromagnetic waves for non-contact and non-destructive detecting. Terahertz waves operate in the frequency range of $10^{11}$ Hz to $10^{13}$ Hz (0.1 THz to 10 THz), allowing penetration through non-conductive materials and measurement of highly water-containing substances. The advantage of terahertz-based detection lies in the ability to penetrate various materials, enabling assessment of optical coefficients, electrical characteristics, layer thickness, and structural defects within different layers of composite materials. The terahertz-based detection may be applied in quality control during manufacturing processes, inspection of intermediate or final products, etc. When detecting composite structures using terahertz electromagnetic waves, the frequency of terahertz waves is much lower than that of infrared electromagnetic waves (ranging from $10^{13}$ Hz to $10^{15}$ Hz), such that the energy carried by terahertz photons is smaller, to prevent disruption in molecular structures, and thus maintain the integrity of composite structures without causing further damage or expanding existing defects. Therefore, terahertz electromagnetic waves may be applied to the inspection of silicon photonics or printed circuit boards with composite structures.

Figure 1:
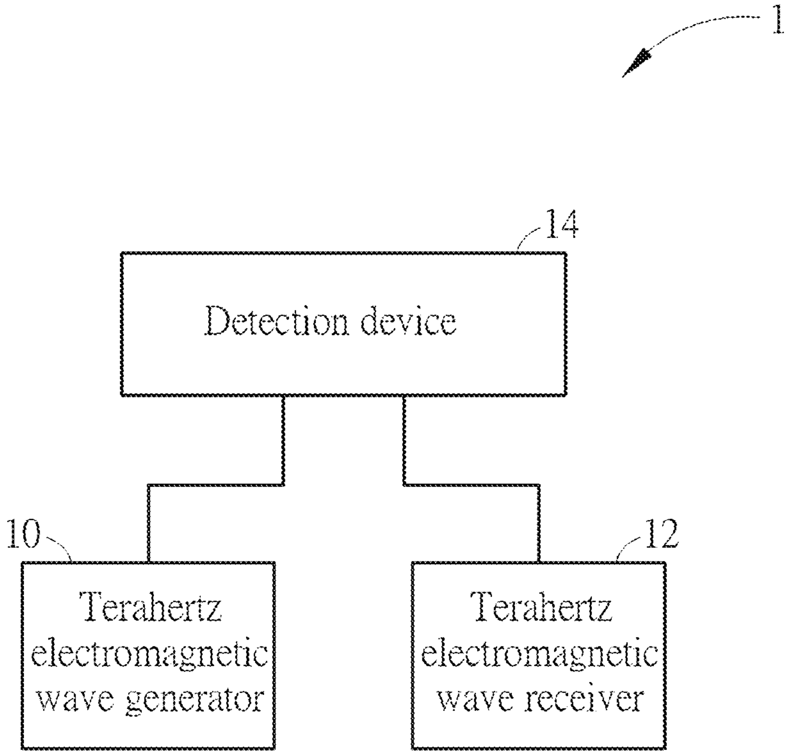
FIG. 1 is a block diagram of a composite structure detecting system 1 according to an embodiment of the present invention.

Specifically, please refer to FIG. 1, which is a block diagram of a composite structure detecting system 1 according to an embodiment of the present invention. The composite structure detecting system 1 comprises a terahertz electromagnetic wave generator 10, a terahertz electromagnetic wave receiver 12, and a detection device 14. The composite structure detecting system 1 may assess composite structures containing a plurality of interface layers, where the materials for the interface layers may be selected from compounds, insulators, semiconductors, or metals. The terahertz electromagnetic wave generator 10 generates a terahertz emission electromagnetic wave, which is directed toward the composite structure. The terahertz electromagnetic wave receiver 12 detects terahertz reception electromagnetic waves reflected, transmitted, or scattered by the plurality of interface layers within the composite structure. The detection device 14 is coupled to both the terahertz electromagnetic wave generator 10 and the terahertz electromagnetic wave receiver 12, and is configured to measure a plurality of characteristic signals based on the terahertz emission electromagnetic wave and the terahertz reception electromagnetic waves, and to analyze the characteristic signals and accordingly determine the characteristics of the plurality of interface layers. As a result, the detection device 14 may further determine or provide the user a reference for determining whether the composite structure includes defects such as delamination, voids, cracks, fractures, dislocations, and deformations.

In the composite structure detecting system 1, the terahertz electromagnetic wave generator 10 is used to generate the terahertz emission electromagnetic waves, and the generation method thereof is not limited to specific structures and may include procedure of linear polarization, circular polarization, or elliptical polarization. In one implementation, the terahertz electromagnetic wave generator 10 may consist of a titanium sapphire femtosecond laser generator and optical components. The titanium sapphire femtosecond laser generator generates a pulsed infrared beam with a central wavelength of 800 nm, a pulse repetition rate of 76 MHz, and an output power of 1.1 W. The pulsed infrared beam is focused by the optical elements to form terahertz emission electromagnetic waves.

In one embodiment, the terahertz emission electromagnetic wave generated by the terahertz electromagnetic wave generator 10 may be output to the detection device 14 via a beam splitter and a delay device, such that the detection device 14 may measure the characteristic signals based on the terahertz reception electromagnetic waves received by the terahertz electromagnetic wave receiver 12 and the terahertz emission electromagnetic wave generated by the terahertz electromagnetic wave generator 10 (without passing through the composite structure). Alternatively, in another embodiment, the detection device 14 may separately measure multiple characteristic signals based on the terahertz reception electromagnetic waves when no composite structure is present and when the composite structure to be tested is present. In other words, the detection device 14 measures multiple characteristic signals based on signals from the terahertz emission electromagnetic waves detecting air and detecting the composite structure. The signals from the terahertz emission electromagnetic waves detecting air may be obtained from the terahertz emission electromagnetic waves generated by the terahertz electromagnetic wave generator 10 via the beam splitter and the delay device, or may be the terahertz reception electromagnetic waves when no composite structure is present, and is not limited to these scenarios.

Figure 2:
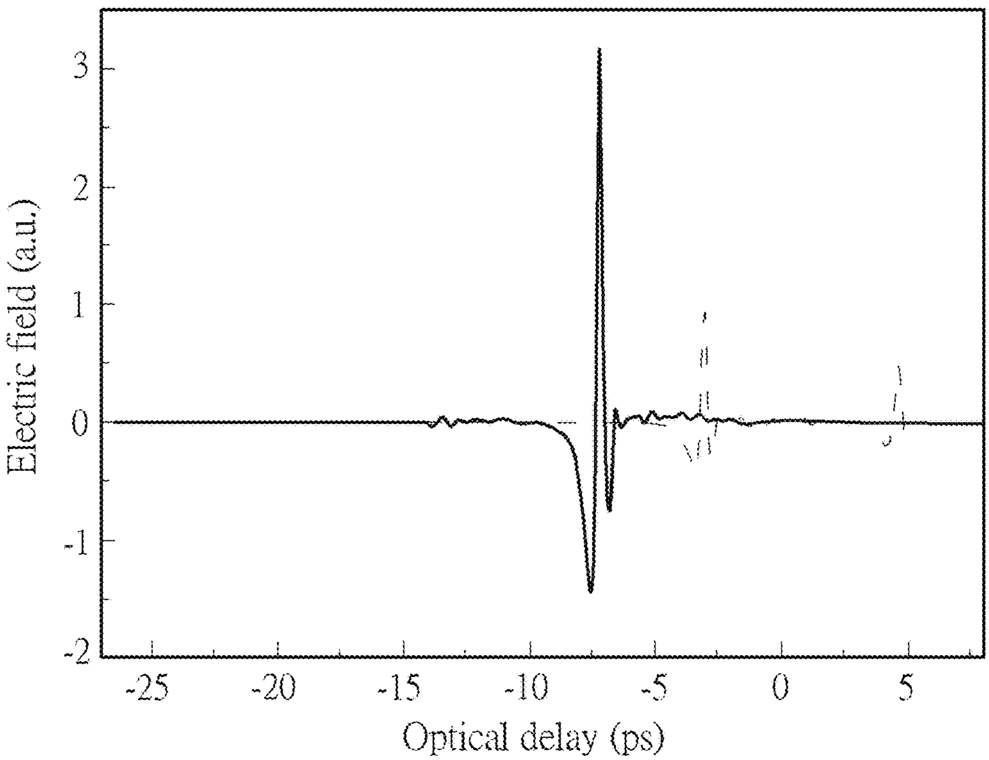
FIG. 2 and FIG. 3 are schematic diagrams of time-domain and frequency-domain optical spectra detected by the terahertz emission electromagnetic waves.
Figure 3:
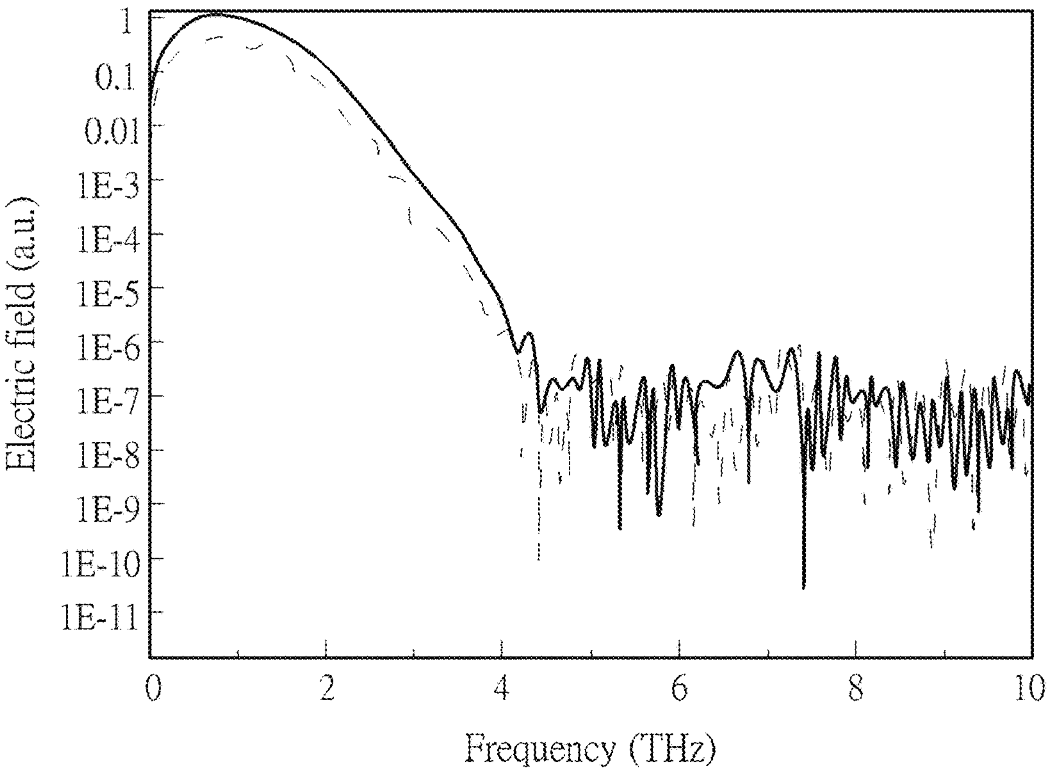

Furthermore, the detection device 14 may compare the signals obtained from the terahertz emission electromagnetic waves detecting air with the signals obtained from the terahertz emission electromagnetic waves detecting the composite structure, and analyze both the time-domain and frequency-domain optical spectra to measure characteristic signals. For example, please refer to FIG. 2 and FIG. 3. FIG. 2 and FIG. 3 are schematic diagrams of time-domain and frequency-domain optical spectra detected by the terahertz emission electromagnetic waves. In FIG. 2, the solid line represents the electric field versus the optical delay when the terahertz emission electromagnetic wave detects air (without the composite structure under test) in the time-domain optical spectrum, and the dashed line represents the electric field versus the optical delay when the terahertz emission electromagnetic wave detects the composite structure in the time-domain optical spectrum. In FIG. 3, the solid line represents the electric field versus the frequency when the terahertz emission electromagnetic wave detects air (without the composite structure under test) in the frequency-domain optical spectrum, and the dashed line represents the electric field versus the frequency when the terahertz emission electromagnetic wave detects the composite structure in the frequency-domain optical spectrum. By analyzing the time-domain and frequency-domain optical spectra, the detection device 14 may measure coefficients or parameters such as refractive index, dielectric constant, conductivity, and doping concentration for each layer of the composite structure. The detection device 14 may also analyze the internal structure and identify defects of the composite structure or provide a reference for determining the defects. The defects may include material impurities (inhomogeneity, e.g. cause by bubbles and multiple materials incompletely or unevenly mixed), lattice dislocations, uneven doping concentrations, etc. Specifically, the detection device 14 measures the transient electric field of each terahertz reception electromagnetic wave in the time domain to obtain an intensity and a phase of the transient electric field, and measures the spectral electric field between terahertz reception electromagnetic waves in the frequency domain to obtain an amplitude and a phase of the spectral electric field. That is, the characteristic signals measured by the detection device 14 may comprise the intensity and the phase of the transient electric field of each terahertz reception electromagnetic wave in the time domain, as well as the amplitude and the phase of the spectral electric field in the frequency domain. Since the characteristic signals (the intensity and the phase of the transient electric field, the amplitude and the phase of the spectral electric field) provide sensitivity to material properties, by applying transformations (e.g., Fourier transforms), the detection device 14 may directly measure dielectric constants of the material and calculate optical coefficients thereof (such as absorption, refraction, reflection, and transmission), electrical coefficients (such as conductivity, doping concentration, and charge carrier mobility), resistance, and structural characteristics. Additionally, the detection device 14 may measure the time of flight for each of the multiple terahertz reception electromagnetic waves and analyze the time of flight to determine the thickness of each of the interface layers. In this way, the detection device 14 may analyze whether there are anomalies in the structure between the interface layers, whether the component position is abnormal, whether the thickness matches the development design, and whether there are stress variations based on the time-of-flight optical spectral signal, which may also be used to determine whether there are process technology errors or if the component is defective.

Therefore, by comparing signals of the terahertz emission electromagnetic waves detecting air with those detecting the composite structure, the detection device 14 may measure the plurality of characteristic signals related to the composite structure, so as to determine the characteristics of the plurality of interface layers. The characteristic signals may include the time-domain electric field intensity and phase of each terahertz reception electromagnetic wave, as well as the amplitude and phase of the spectral electric field between the terahertz reception electromagnetic waves. The characteristics of the interface layers may include thickness, optical coefficients, electrical coefficients, dielectric constants, structural states, resistance, and stress changes for each interface layer. Based on this information, the detection device 14 may further determine whether the composite structure contains defects or provide evidence for defect assessment.

Figure 4:
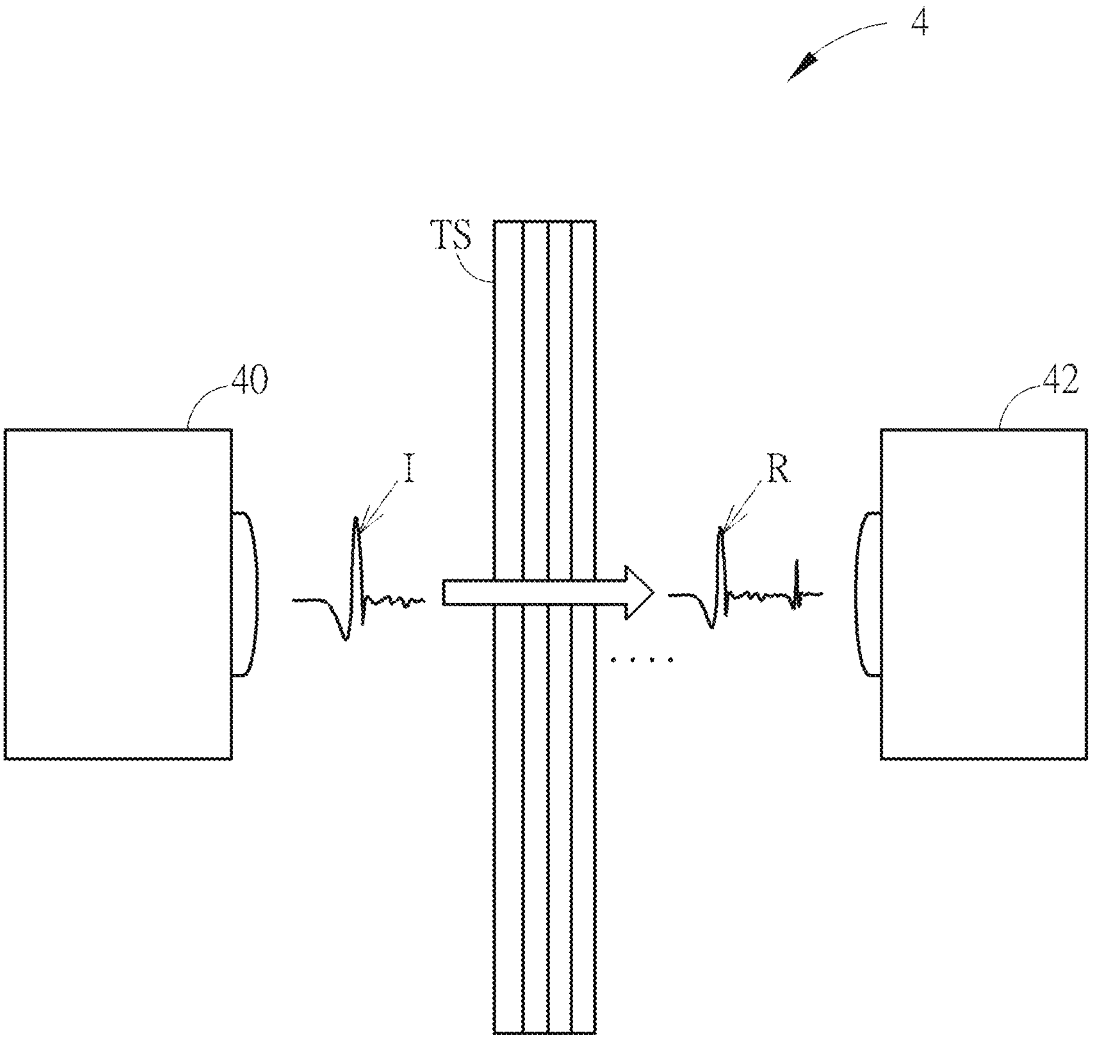
FIG. 4 and FIG. 5 are schematic diagrams of composite structure detecting systems according to embodiments of the present invention.
Figure 5:
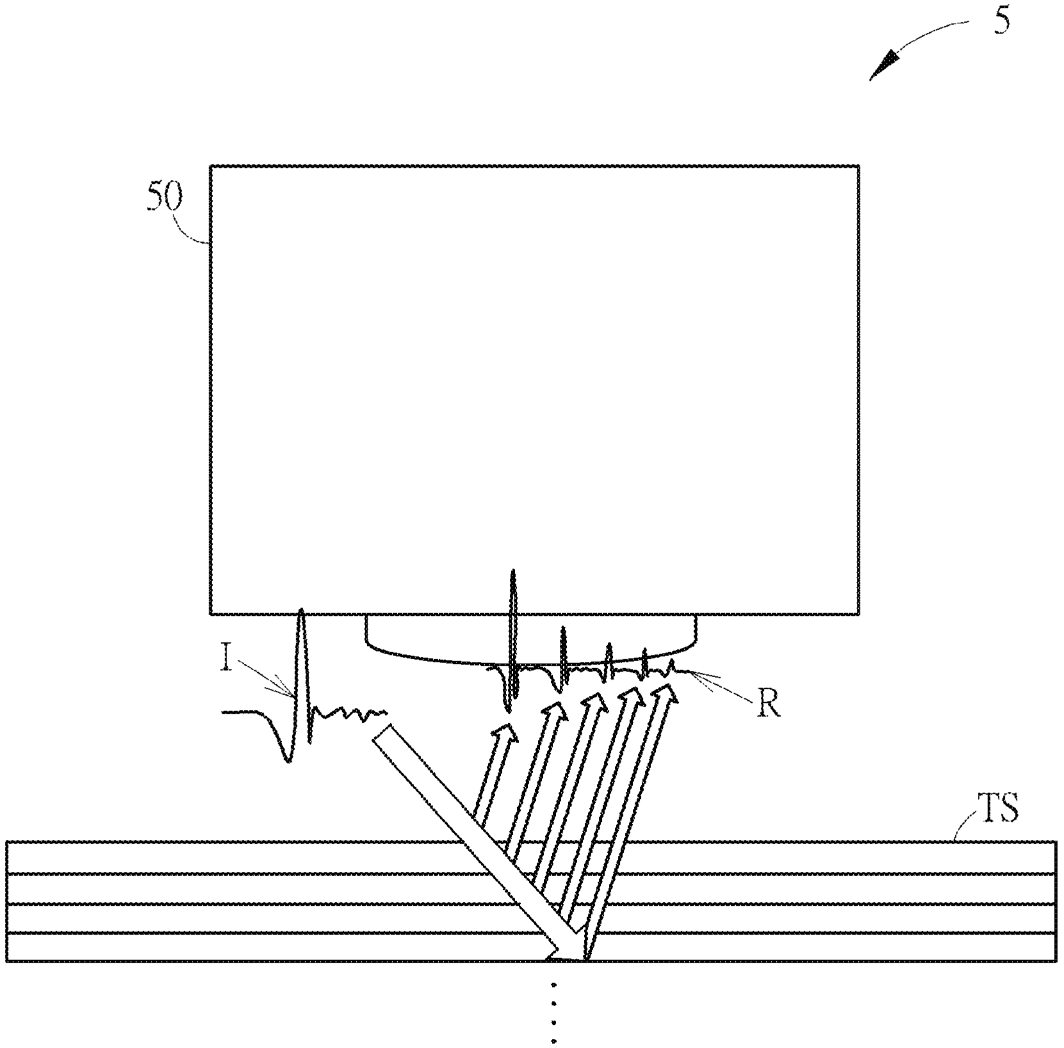

Please note that, FIG. 1 uses functional blocks to illustrate the essential components of the embodiment of the present invention. However, when implementing the composite structure detecting system 1, those skilled in the art may design or choose an appropriate architecture based on practical needs. For example, refer to FIG. 4 and FIG. 5, which are schematic diagrams of composite structure detecting systems 4 and 5 according to embodiments of the present invention. The composite structure detecting systems 4 and 5 are derived from the composite structure detecting system 1, and use transmission and reflection-based terahertz electromagnetic wave detection architectures, respectively. For simplicity, FIG. 4 and FIG. 5 omit the specific position of the detection device 14, which can be inferred from FIG. 1 by those skilled in the art. In detail, the composite structure detecting system 4 uses a terahertz electromagnetic wave generator 40 to generate the terahertz emission electromagnetic wave I, which then passes through a test specimen TS (such as the composite structure), and uses the terahertz electromagnetic wave receiver 42 to detect the terahertz reception electromagnetic waves R transmitted through the test specimen TS. On the other hand, the composite structure detecting system 5 uses a reflection-based detection architecture, where a terahertz electromagnetic wave generator and receiver 50 integrates both emission and reception functions. In other words, the terahertz electromagnetic wave generator and receiver 50 generates the terahertz emission electromagnetic wave I, which is directed at the test specimen TS (such as the composite structure), and detects the terahertz reception electromagnetic waves R reflected by the test specimen TS after the terahertz emission electromagnetic wave I is incident on the test specimen TS. The operation of the composite structure detecting systems 4 and 5 can be understood similarly to the operation of the composite structure detecting system 1, where the detection device (not shown in FIG. 4 and FIG. 5) analyzes the time-domain and frequency-domain optical spectra based on the terahertz emission electromagnetic wave I (before passing through the test specimen TS) and the terahertz reception electromagnetic waves R (after passing through the test specimen TS). This analysis allows measurement of various characteristic signals and determination of refractive index, dielectric constant, conductivity, doping concentration, and internal structure of the test specimen TS, as well as identification of defects or evidence for defect assessment.

Note that the composite structure detecting systems 4 and 5 are respectively transmission and reflection terahertz electromagnetic wave detection architectures derived from the composite structure detecting system 1. In this field, those skilled in the art may choose an appropriate architecture based on actual needs or the specific item to be inspected, which is not limited to the ones mentioned here. Generally, the transmission terahertz electromagnetic wave detection architecture can directly penetrate the composite structure, providing information on overall signal phase differences and signal intensity variations. On the other hand, the reflection terahertz electromagnetic wave detection architecture reflects signals when passing through interfaces between layers, which return one or multiple terahertz waves. Analyzing these signals allows for obtaining phase and intensity differences, and determining the structural plane distribution, thickness variations, and material parameters (such as refractive index, dielectric constant, conductivity, doping concentration, and stress) of each layer.

Figure 6:
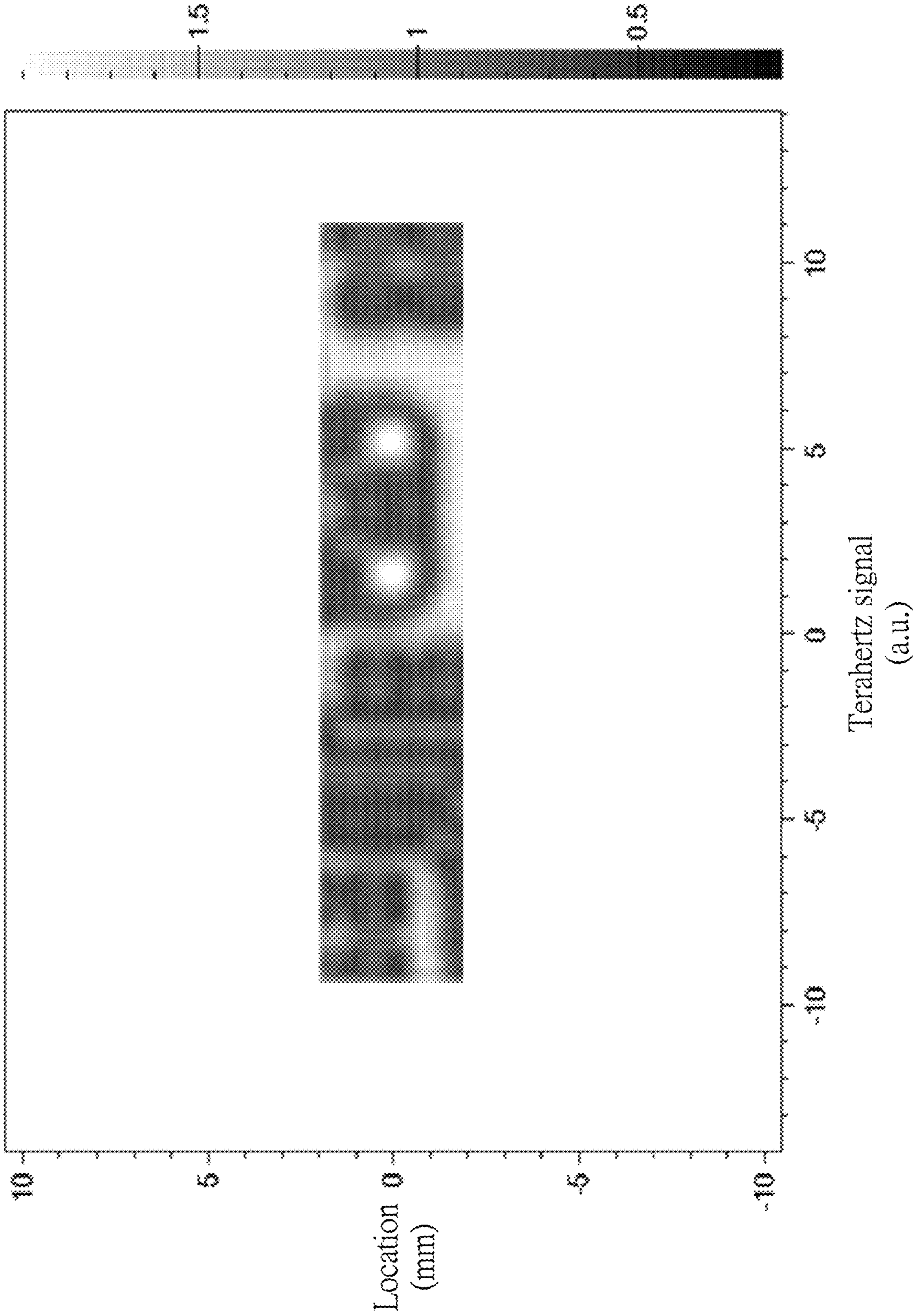
FIG. 6 and FIG. 7 are schematic diagrams illustrating C-Scan and B-Scan detection of a composite structure of a photonic integrated circuit by the composite structure detecting system shown in FIG. 1.
Figure 7:
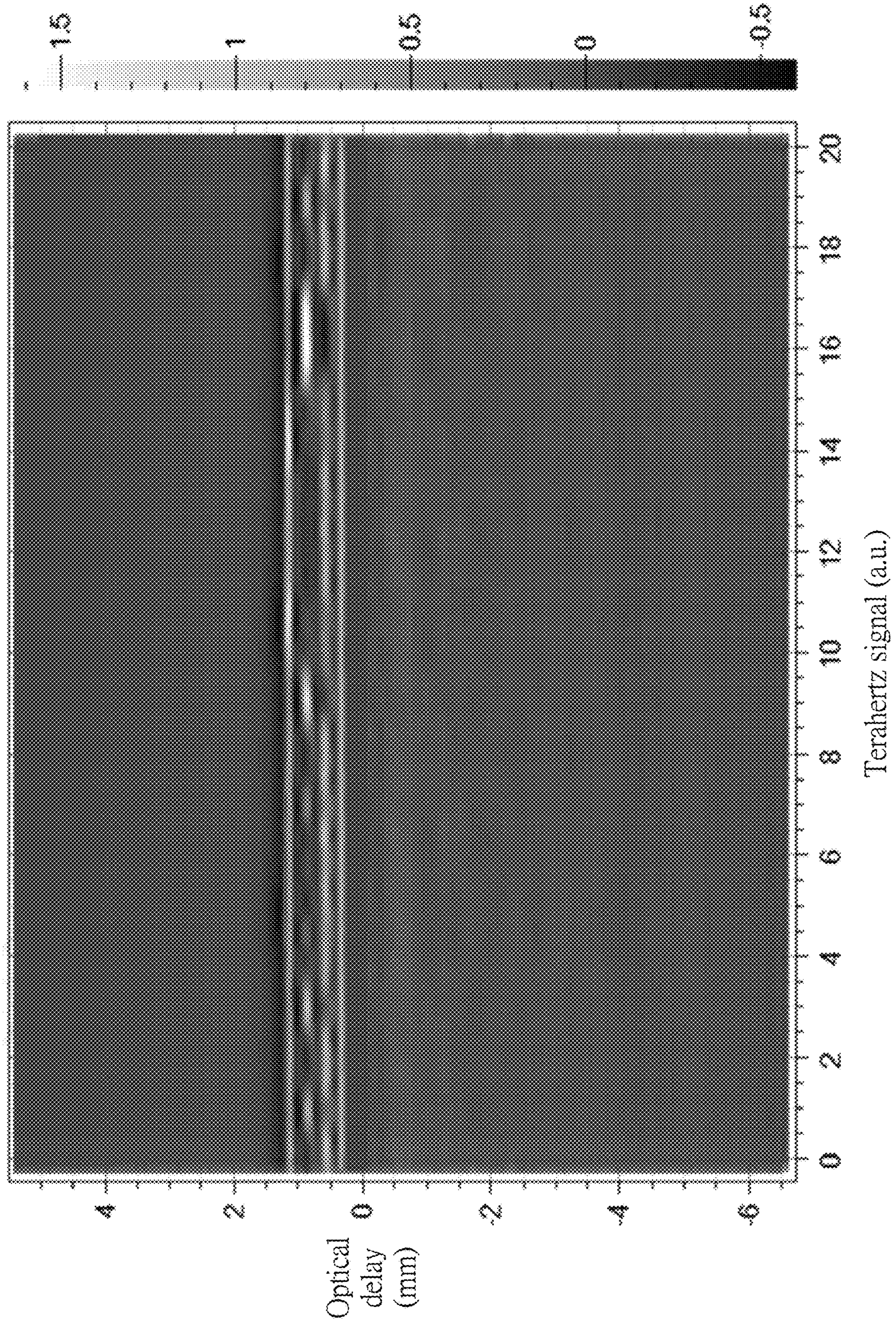
Figure 8:
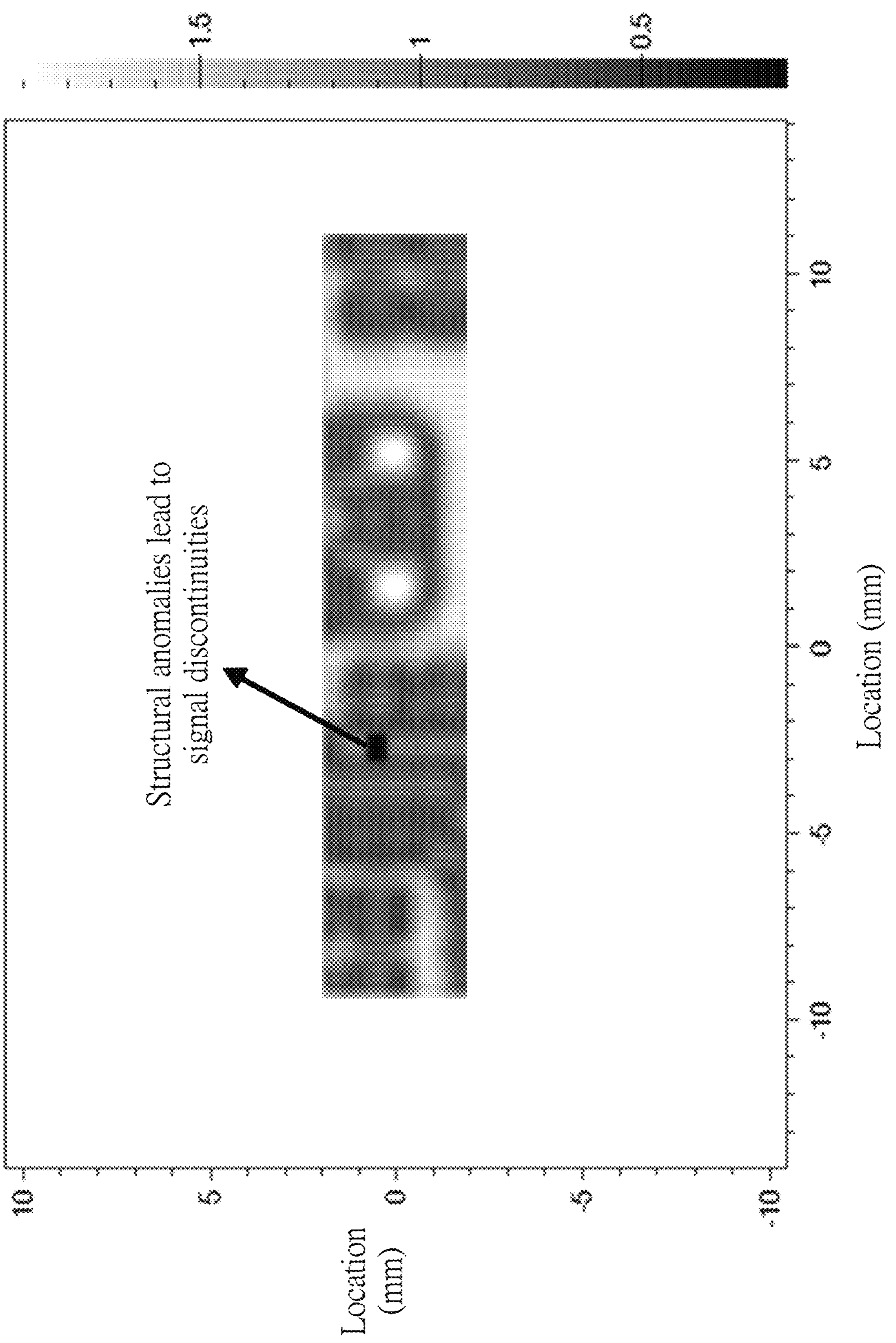
FIG. 8 and FIG. 9 are schematic diagrams illustrating C-Scan and B-Scan detection for the same composite structure with defects.
Figure 9:
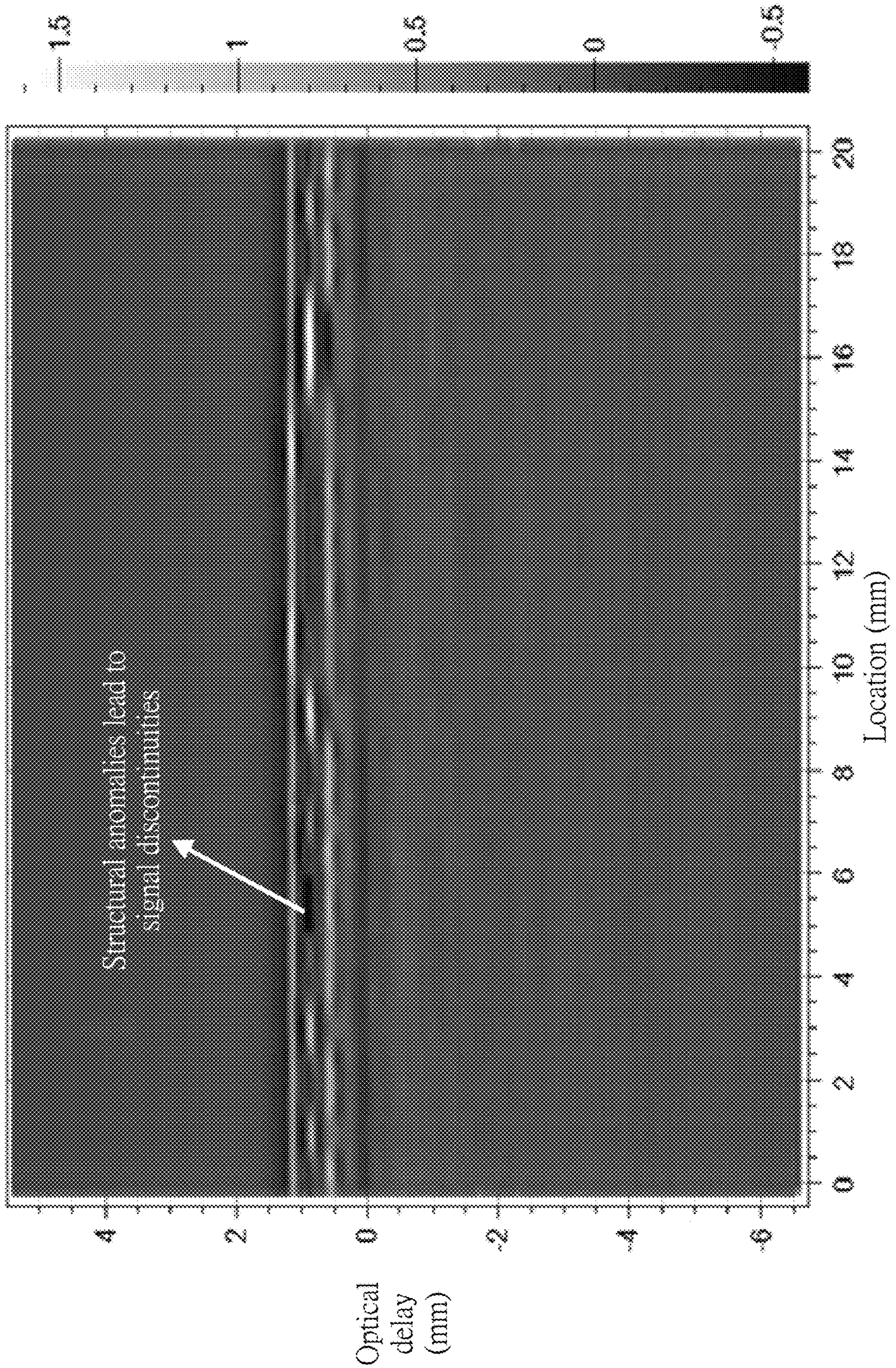

Additionally, the embodiment of the present invention is applicable for detecting various composite structures, such as silicon photonics or printed circuit boards. For instance, in the context of silicon photonics, the photonic integrated circuit (PIC) under Co-Packaged Optics (CPO) technology includes substrate, insulating layer, waveguide layer, and cladding layer. Common materials used include silicon (Si), silicon dioxide (SiO2), lithium niobate (LiNbO3), silicon nitride (Si3N4), gallium arsenide (GaAs), silicon carbide (SiC), gallium oxide (Ga2O3), diamond, indium tin oxide (ITO), indium gallium zinc oxide (IGZO), aluminum oxide (Al2O3), and germanium (Ge). For example, the substrate material may be silicon (Si), the insulating layer material may be silicon dioxide (SiO2), and the waveguide material may be silicon nitride (Si3N4, SiN) or silicon (Si), among others. The cladding layer may consist of silicon (Si) or silicon dioxide (SiO2). Furthermore, the regions inspected in the embodiment of the present invention may be specific points, where single-point detection provides results similar to those shown in FIG. 2 and FIG. 3. Alternatively, the inspection region may cover a specific area, by moving the detector or the sample stage, to reach scanning-mode detection. For instance, FIG. 6 and FIG. 7 are schematic diagrams illustrating C-Scan and B-Scan detection of a composite structure of a photonic integrated circuit by the composite structure detecting system 1. In this context, C-Scan represents a planar scan of the composite structure, while B-Scan represents a cross-sectional scan. By observing the signals of each area of the composite structure in FIG. 6 and FIG. 7, one can assess whether there are thickness errors, intact material interfaces without delamination, or impurities in the structure. For example, FIG. 8 and FIG. 9 show similar C-Scan and B-Scan detection for the same composite structure with defects. Comparing FIG. 6, FIG. 7, FIG. 8, and FIG. 9 reveals that internal structural anomalies of the composite structure lead to signal discontinuities. Therefore, the results from the composite structure detecting system 1 allow inspectors to reject defective products and provide insights for researchers to identify the causes of defects, such as poor bonding between layers or process-induced defects due to uneven stress distribution during material fabrication.

Figure 10:
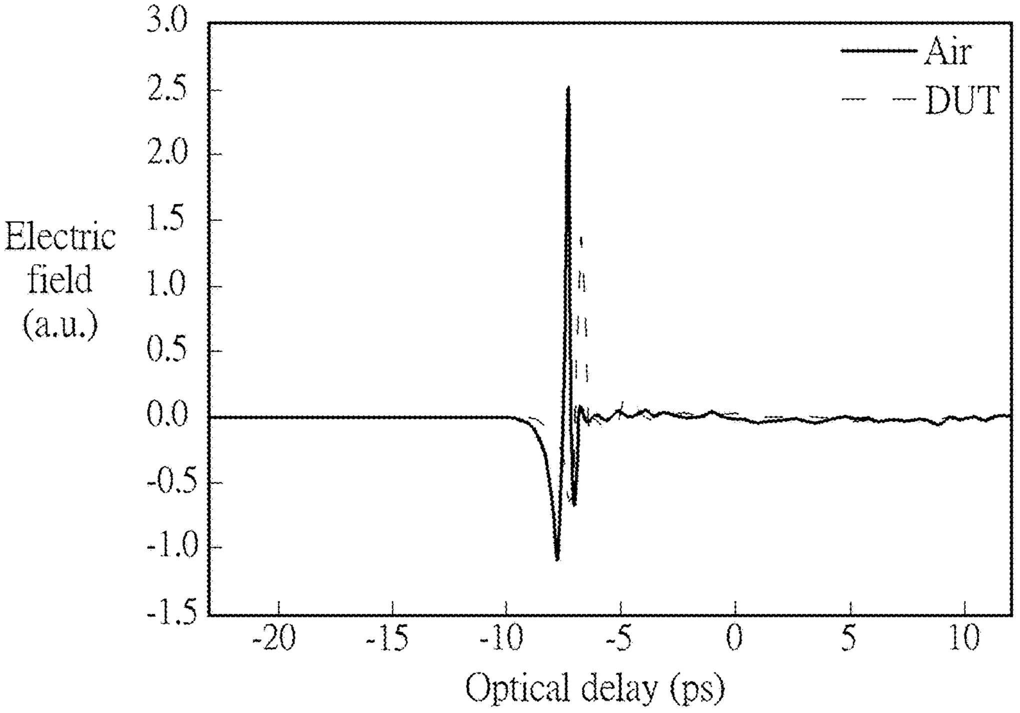
FIG. 10 and FIG. 11 are schematic diagrams of time-domain and frequency-domain optical spectra when the composite structure detecting system shown in FIG. 1 detects a composite structure.
Figure 11:
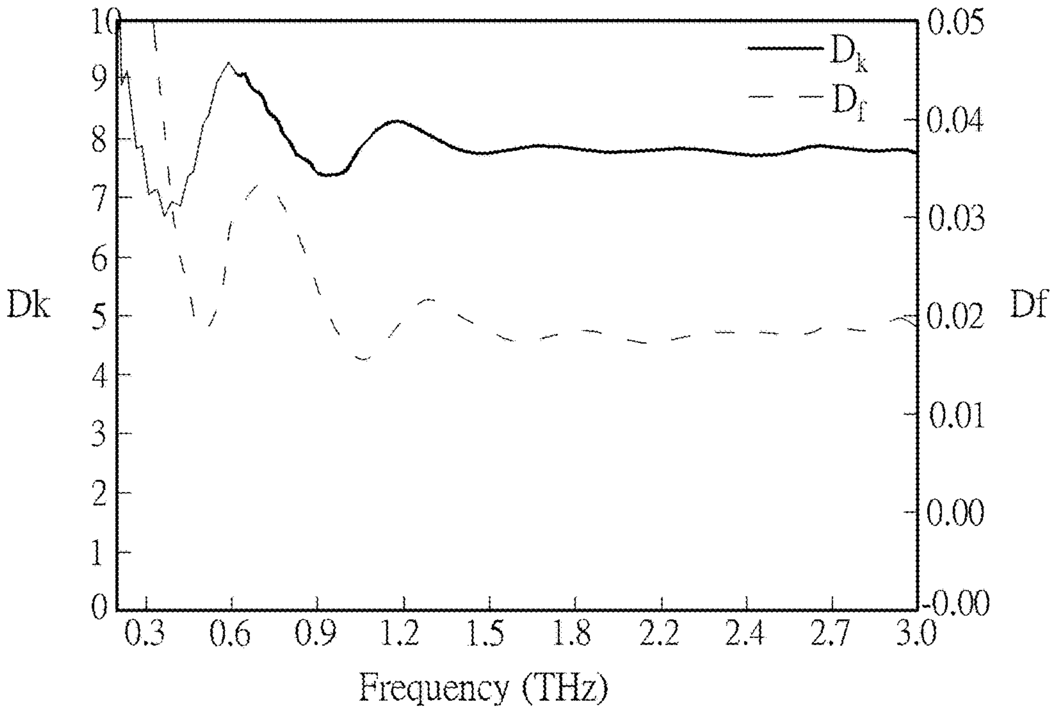
Figure 12:
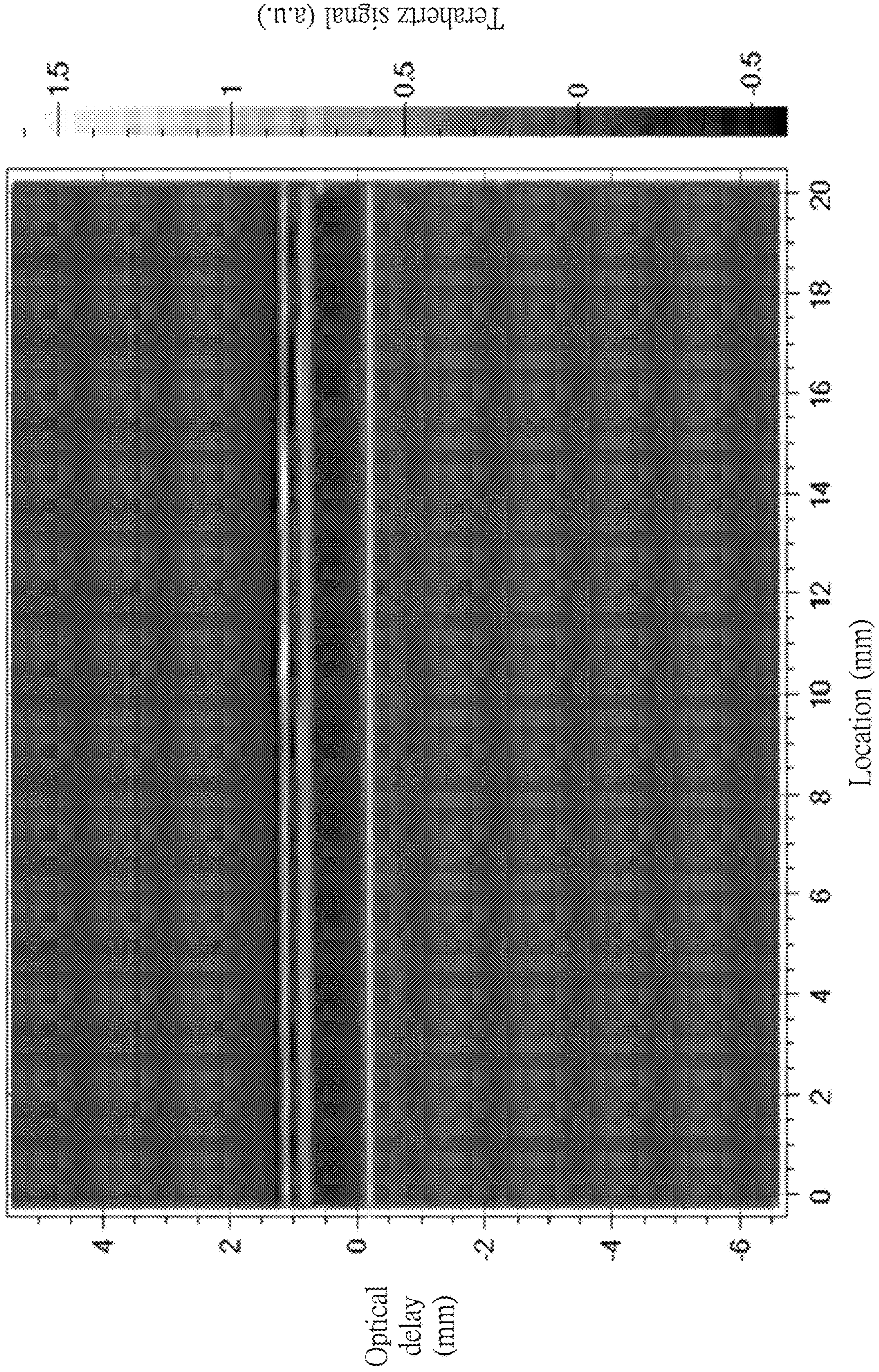
FIG. 12 and FIG. 13 are schematic diagrams of the composite structure detecting system shown in FIG. 1 detecting uniformity of a composite structure.
Figure 13:
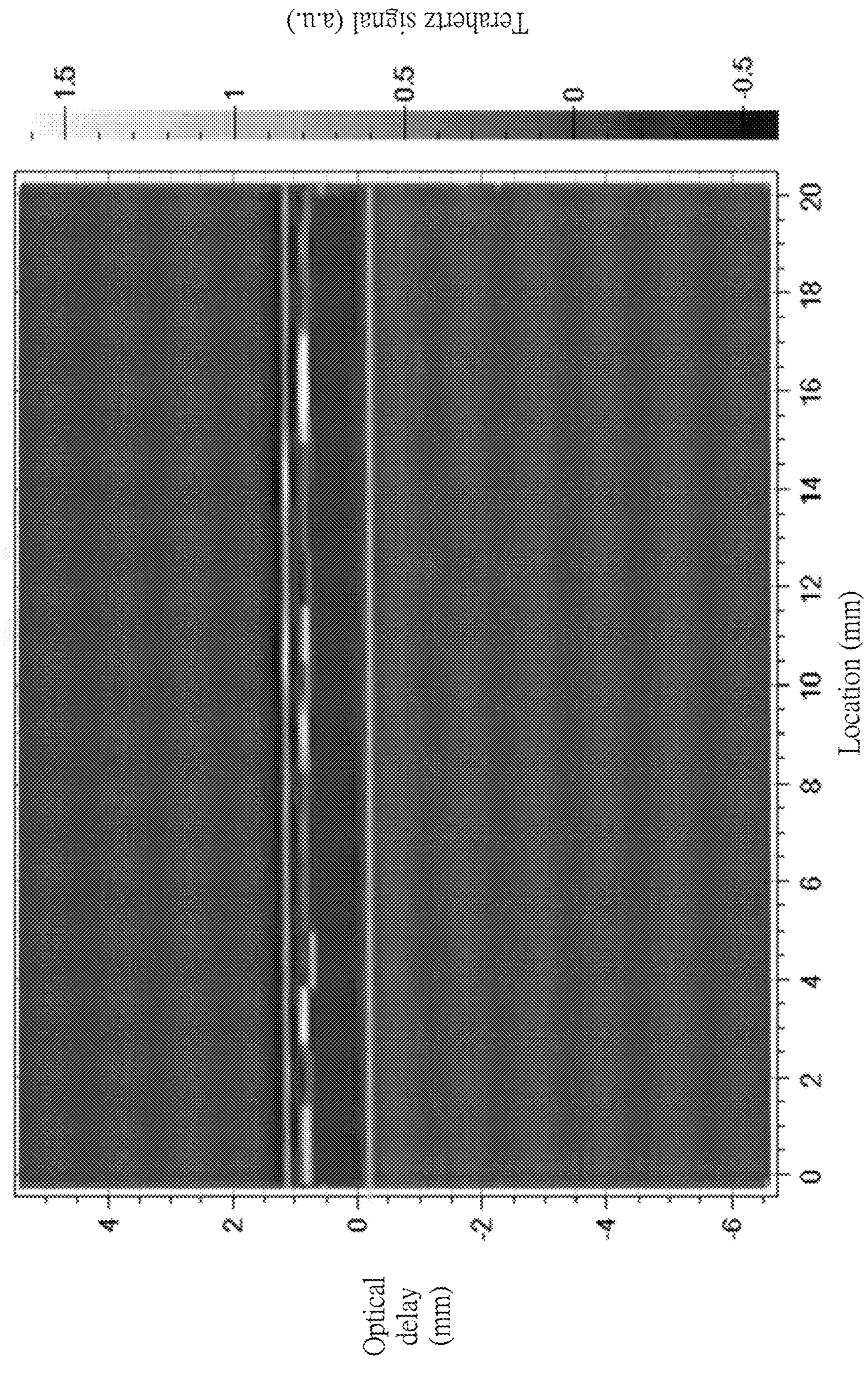

In silicon photonics applications, such as waveguide structures in silicon photonic integrated circuits, the focus extends beyond structural defects to stringent requirements for optical properties and uniformity due to their use in light transmission. In such cases, the composite structure detecting system 1 may analyze parameters like refractive index (n, k), dielectric constants (such as ε', ε", Dk, Df), resistivity (Ω), and conductivity (σ) for each layer, and verify whether the optical properties and electrical characteristics of specific regions in the sample align with the design. For example, please refer to FIG. 10 and FIG. 11. FIG. 10 and FIG. 11 are schematic diagrams of time-domain and frequency-domain optical spectra when the composite structure detecting system 1 detects a composite structure. In FIG. 10, the solid line represents the electric field versus the optical delay when the terahertz emission electromagnetic wave detects air (without the composite structure under test), and the dashed line represents the electric field versus the optical delay when the terahertz emission electromagnetic wave detects the composite structure. In FIG. 11, the solid line represents the frequency-domain pattern of the sample's dielectric constant Dk, and the dashed line represents the frequency-domain pattern of the sample's dielectric constant Df. Using this information, inspection personnel may assess whether the sample's dielectric constant meets the requirements. Similarly, the composite structure detecting system 1 may evaluate the uniformity of the composite structure. For instance, FIG. 12 and FIG. 13 are schematic diagrams of the composite structure detecting system 1 detecting uniformity of a composite structure. FIG. 12 illustrates the results for a well-uniform composite structure, while FIG. 13 shows the detection results for a non-uniform composite structure.

Figure 14:
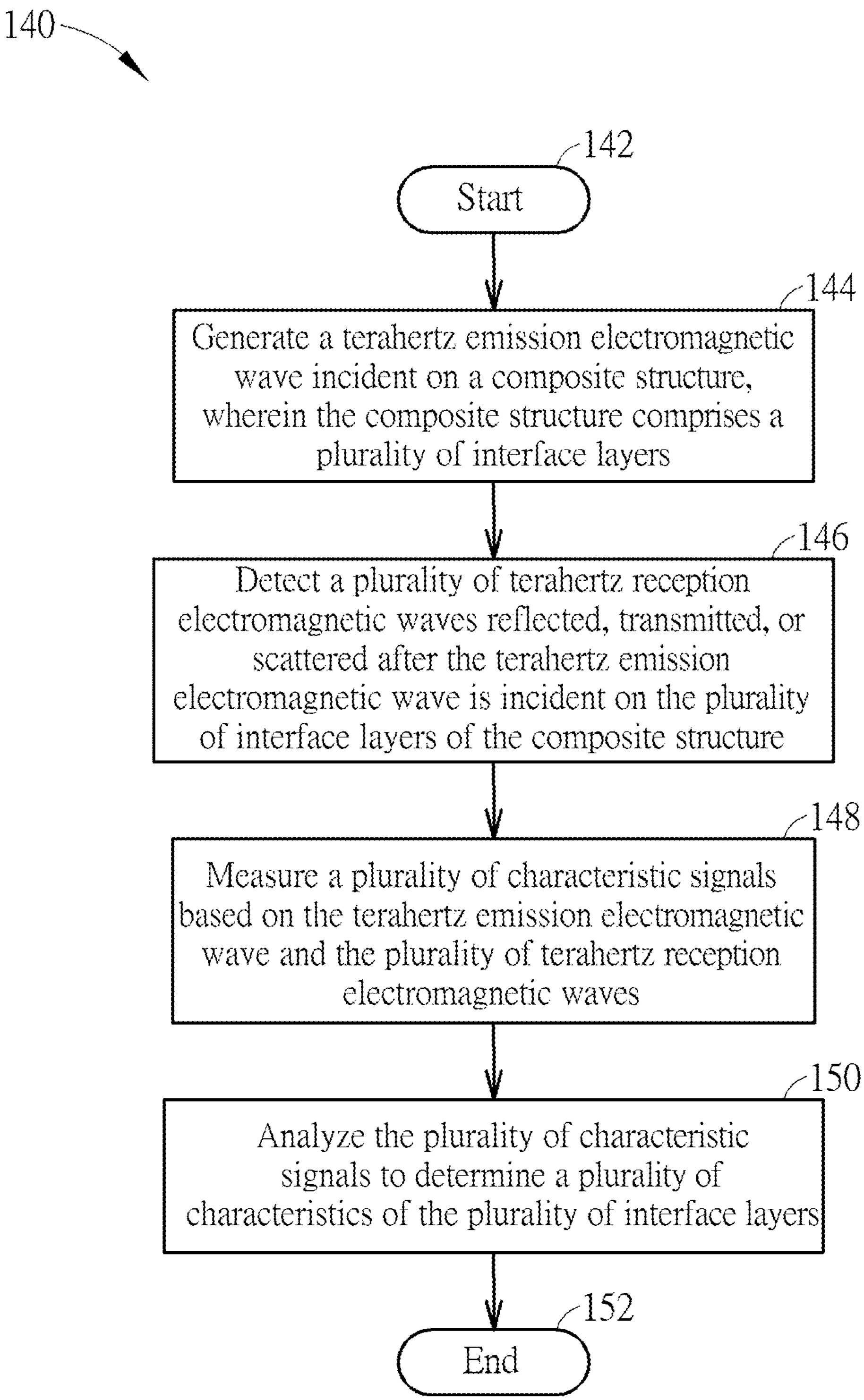
FIG. 14 is a flowchart of a composite structure detection process according to an embodiment of the present invention.

The operation of the composite structure detection systems 1, 4, and 5 described above may be summarized as a composite structure detection process 140, as shown in FIG. 14. The composite structure detection process 140 is used to detect a composite structure and includes the following steps:

Step 142: Start.

Step 144: Generate a terahertz emission electromagnetic wave incident on a composite structure, wherein the composite structure comprises a plurality of interface layers.

Step 146: Detect a plurality of terahertz reception electromagnetic waves reflected, transmitted, or scattered after the terahertz emission electromagnetic wave is incident on the plurality of interface layers of the composite structure.

Step 148: Measure a plurality of characteristic signals based on the terahertz emission electromagnetic wave and the plurality of terahertz reception electromagnetic waves.

Step 150: Analyze the plurality of characteristic signals to determine a plurality of characteristics of the plurality of interface layers.

Step 152: End.

For detailed operations and variations of the composite structure detection process 140, please refer to the previous explanation, which will not be repeated.

In the prior art, when materials are not transparent to visible light, the completed structures cannot be inspected using techniques such as visible light microscopy. Common defects in such structures include variations in deposited layer thickness, residual internal defects, misalignment errors during exposure, and differences in material doping concentrations. In comparison, the present invention relies on the terahertz emission electromagnetic waves and the terahertz reception electromagnetic waves, to measure and analyze characteristic signals, so as to determine various properties of the interface layers. Terahertz electromagnetic waves have the ability to penetrate many materials, making it possible to assess optical coefficients, electrical properties, layer thickness, and detect structural defects within different materials and structures. This technology can be applied to technical inspections during the manufacturing process, as well as for inspecting semi-finished or finished products. Consequently, the present invention enables non-contact and non-destructive testing of opaque composite structures, helping to maintain their integrity without exacerbating any existing damage or defects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A composite structure detecting method, comprising:

generating a terahertz emission electromagnetic wave incident on a composite structure, wherein the composite structure comprises a plurality of interface layers;

detecting a plurality of terahertz reception electromagnetic waves reflected, transmitted, or scattered after the terahertz emission electromagnetic wave is incident on the plurality of interface layers of the composite structure;

measuring a plurality of characteristic signals based on the terahertz emission electromagnetic wave and the plurality of terahertz reception electromagnetic waves; and analyzing the plurality of characteristic signals to determine a plurality of characteristics of the plurality of interface layers;

wherein the step of analyzing the plurality of characteristic signals to determine the plurality of characteristics of the plurality of interface layers comprises performing a C-Scan planar scan or a B-Scan cross-sectional scan on the composite structure, so as to determine a structural anomaly of one of the plurality of interface layers when the plurality of characteristic signals show a measurement result of signal discontinuity in an interface layer;

wherein the determination of the structural anomaly of the interface layer is based on a result of the C-Scan planar scan or the B-Scan cross-sectional scan showing that a time-of-flight spectral signal corresponding to the interface layer has a measurement result of signal discontinuity.

2. The composite structure detecting method of claim 1, wherein a frequency of the terahertz emission electromagnetic waves is between $10^{11}$ Hz and $10^{13}$ Hz.

3. The composite structure detecting method of claim 1, wherein the plurality of characteristic signals comprise an electric field intensity and an electric field phase of each of the plurality of terahertz reception electromagnetic waves.

4. The composite structure detecting method of claim 3, wherein the plurality of characteristic signals further comprise at least one spectral electric field between the plurality of terahertz reception electromagnetic waves, and each spectral electric field comprises an electric field amplitude and an electric field phase.

5. The composite structure detecting method of claim 1, wherein the plurality of characteristics comprise at least one of a thickness, an optical coefficient, an electrical coefficient, a dielectric constant, a structural state, resistance, and stress change of each interface layer of the plurality of interface layers.

6. The composite structure detecting method of claim 5, wherein the electrical coefficient is a conductivity, a doping concentration, or a charge carrier mobility, and the optical coefficient is selected from an absorption rate, a refractive rate, a reflection rate, and a transmission rate.

7. The composite structure detecting method of claim 1, further comprising determining whether the composite structure comprises at least one defect based on the plurality of characteristics.

8. The composite structure detecting method of claim 7, wherein the at least one defect is at least one of interface delamination, a hole, a crack, a fracture, a dislocation, or a deformation.

9. The composite structure detecting method of claim 1, wherein the composite structure is utilized for a waveguide structure of a silicon photonic integrated optical path, and a material of the composite structure is selected from at least one of silicon (Si), silicon dioxide (SiO2), lithium niobate (LiNbO3), silicon nitride (Si3N4), gallium arsenide (GaAs), silicon carbide (Sic), gallium oxide (Ga2O3), diamond, indium tin oxide (ITO), indium gallium zinc oxide (IGZO), aluminum oxide (Al2O3), and germanium (Ge).

10. A composite structure detection system, comprising:

a terahertz electromagnetic wave generator, configured to generate a terahertz emission electromagnetic wave incident on a composite structure, wherein the composite structure comprises a plurality of interface layers;

a terahertz electromagnetic wave receiver, configured to detect a plurality of terahertz reception electromagnetic waves reflected, transmitted, or scattered after the terahertz emission electromagnetic wave is incident on the plurality of interface layers of the composite structure; and a detection device, coupled to the terahertz electromagnetic wave generator and the terahertz electromagnetic wave receiver, configured to measure a plurality of characteristic signals based on the terahertz emission electromagnetic wave and the plurality of terahertz reception electromagnetic waves, and analyze the plurality of characteristic signals to determine a plurality of characteristics of the plurality of interface layers;

wherein the detection device analyzes the plurality of characteristic signals to determine the plurality of characteristics of the plurality of interface layers by performing a C-Scan planar scan or a B-Scan cross-sectional scan on the composite structure, so as to determine a structural anomaly of one of the plurality of interface layers when the plurality of characteristic signals show a measurement result of signal discontinuity in an interface layer;

wherein the determination of the structural anomaly of the interface layer is based on a result of the C-Scan planar scan or the B-Scan cross-sectional scan showing that a time-of-flight spectral signal corresponding to the interface layer has a measurement result of signal discontinuity.

11. The composite structure detection system of claim 10, wherein a frequency of the terahertz emission electromagnetic waves is between $10^{11}$ Hz and $10^{13}$ Hz.

12. The composite structure detection system of claim 10, wherein the plurality of characteristic signals comprise an electric field intensity and an electric field phase of each of the plurality of terahertz reception electromagnetic waves.

13. The composite structure detection system of claim 12, wherein the plurality of characteristic signals further comprise at least one spectral electric field between the plurality of terahertz reception electromagnetic waves, and each spectral electric field comprises an electric field amplitude and an electric field phase.

14. The composite structure detection system of claim 10, wherein the plurality of characteristics comprise at least one of a thickness, an optical coefficient, an electrical coefficient, a dielectric constant, a structural state, resistance, and stress change of each interface layer of the plurality of interface layers.

15. The composite structure detection system of claim 14, wherein the electrical coefficient is a conductivity, a doping concentration, or a charge carrier mobility, and the optical coefficient is selected from an absorption rate, a refractive rate, a reflection rate, and a transmission rate.

16. The composite structure detection system of claim 10, wherein the detection device is further configured to determine whether the composite structure comprises at least one defect based on the plurality of characteristics.

17. The composite structure detection system of claim 16, wherein the at least one defect is at least one of interface delamination, a hole, a crack, a fracture, a dislocation, or a deformation.

18. The composite structure detection system of claim 10, wherein the composite structure is utilized for a waveguide structure of a silicon photonic integrated optical path, and a material of the composite structure is selected from at least one of silicon (Si), silicon dioxide (SiO2), lithium niobate (LiNbO3), silicon nitride (Si3N4), gallium arsenide (GaAs), silicon carbide (SiC), gallium oxide (Ga2O3), diamond, indium tin oxide (ITO), indium gallium zinc oxide (IGZO), aluminum oxide (Al2O3), and germanium (Ge).

* * * * *